Aug. 27, 1968   R. J. FARRELL ET AL   3,399,008
ROLLER CAGE ASSEMBLY
Filed June 15, 1966   2 Sheets-Sheet 1
FIG. 1.
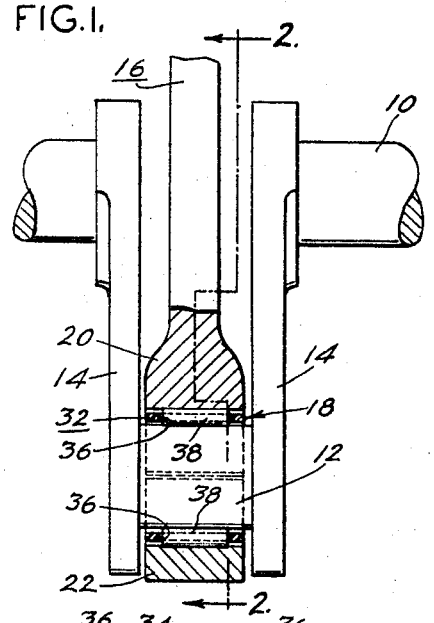
FIG. 2.
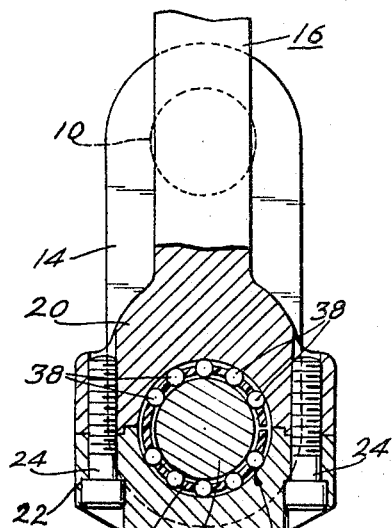
FIG. 3.
FIG. 5.
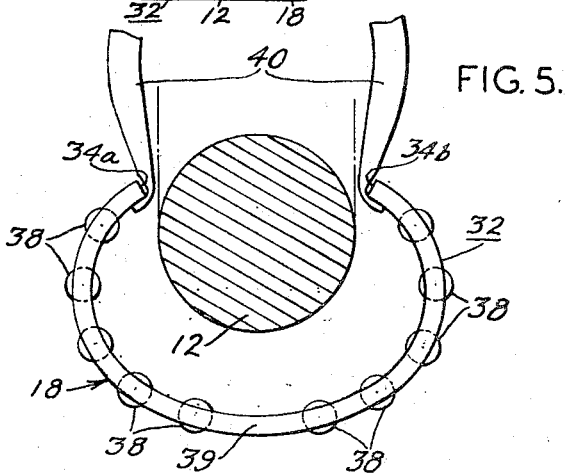
FIG. 4.
FIG. 6.
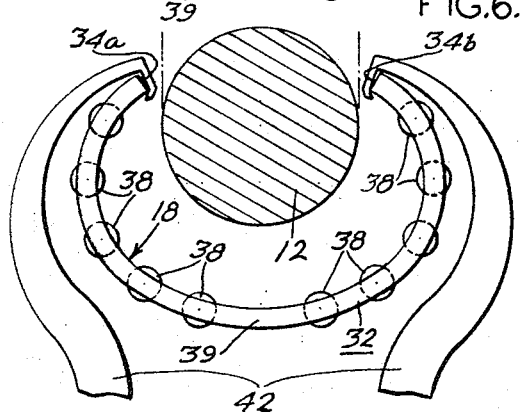
FIG. 7.
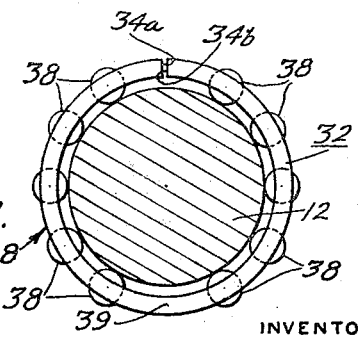
INVENTORS:
RONALD J. FARRELL
FRED LANNERT
DEAN A. BALSLEY
BY Howson & Howson
ATTYS.

Aug. 27, 1968 R. J. FARRELL ET AL 3,399,008
ROLLER CAGE ASSEMBLY
Filed June 15, 1966 2 Sheets-Sheet 2

INVENTORS:
RONALD J. FARRELL
FRED LANNERT
DEAN A. BALSLEY
BY Howson & Howson
ATTYS.

United States Patent Office 3,399,008
Patented Aug. 27, 1968

3,399,008
ROLLER CAGE ASSEMBLY
Ronald J. Farrell, Bremen, and Fred Lannert, South Bend, Ind., and Dean A. Balsley, Philadelphia, Pa., assignors to SKF Industries, Inc., King of Prussia, Pa., a corporation of Delaware
Filed June 15, 1966, Ser. No. 557,654
8 Claims. (Cl. 308—217)

ABSTRACT OF THE DISCLOSURE

A roller cage assembly comprising a split annulus retainer made of a flexible resilient material such as a polyamide or fluorocarbon resin having a plurality of circumferentially spaced openings defining pockets for rolling elements such as rollers. A section of the retainer between adjacent pockets diametrically opposed from the terminal ends is enlarged to permit localized heating at this section and bending of the retainer to facilitate spreading the terminal ends apart so that it may be applied to a shaft member or the like, for example a crankshaft.

---

This invention relates to improvements in rolling bearing assemblies and more particularly to an improved type of roller cage assembly.

The roller cage assembly of the present invention is particularly suitable for use in applications on shaft members where it is not possible to assemble the bearing assembly from one axial end of the shaft. A typical example of such an application is the bearing assembly supporting the connecting rod on the crank pin of a crank shaft. The crank pin is usually offset from the axis of rotation of the crank shaft and connected thereto by a pair of webs formed integrally with opposite axial ends of the crank pin. Thus, in these assemblies it is not possible to use a conventional bearing assembly having annular rings. The bearing used to support the connecting rod usually consists of a pair of semicircular retainers which are held in position over the crank pin until the cap and yoke end of the connecting rod are secured together over the bearing. It has been found that this type of bearing is difficult and clumsy to assemble in this type of installation. Other applications where bearings of this type are employed include the main bearing location for multipiston engines and pumps and in general any bearing location where the bearing shaft is smaller in diameter than the shaft diameters on either side thereof. Half-circle or two-piece cages have been used in the past, but due to the fact that rollers in crank pin assemblies tend to travel faster on one side of the crank pin than they do on the other, causes half-cages to drive or impact on each other which is detrimental to the cage end and the cages themselves which can lead to misalignment and skewing.

The present invention provides a roller cage of simplified construction which is much easier to assemble on the crank pin of a crank shaft and in other similar applications than the two-piece retainer discussed above. In accordance with the present invention, the roller cage assembly comprises a one-piece split ring-type retainer made of a resilient moldable plastic material such as a polyamide or fluorocarbon resin or a type of these plastics which contains a fiber reinforcement, having a plurality of circumferentially spaced pockets with arcuate or curved sidewalls and a plurality of rolling elements such as rollers in the pockets. The pockets are dimensioned relative to the roller size so that the rollers may be snapped in place and retained therein. The roller cage assembly may be assembled to the crank pin of a crank shaft, for example, by heating the retainer, for instance in an oil bath which is below the tempering temperature of the rollers, i.e. 250° F. so that the confronting ends of the retainer may be spread apart sufficiently to be positioned directly on to the crank pin. The retainer is then released and due to its "plastic memory" will assume its former circular shape on the crank pin. This obviously is a much faster and less clumsy method of installing a bearing assembly than the prior two-piece construction discussed above.

The one-piece cage design is also an improvement as it will obviate the wear and possible misalignment problem described above.

With the foregoing in mind, an object of the present invention is to provide a novel roller cage assembly characterized by novel features of construction and arrangement permitting easy and quick assembly to a member on which it is mounted such as a shaft.

Another object of the present invention is to provide a novel roller cage assembly which is comparatively simplified in construction and which lends itself to easy and economical manufacture.

These and other objects of the present invention and the various features and details of the construction of a roller cage assembly and the method of assembling it are hereinafter more fully set forth with reference to the accompanying drawings, wherein:

FIG. 1 is a fragmentary view of a crank shaft assembly incorporating a roller cage assembly in accordance with the present invention;

FIG. 2 is a sectional view taken on lines 2—2 of FIG. 1;

FIG. 3 is an enlarged plan view of the roller cage assembly in accordance with the present invention;

FIG. 4 is a side elevational view partly in section of the roller cage assembly shown in FIG. 3;

FIG. 5 is an enlarged view showing application of a roller cage assembly in accordanue with the present invention on a member such as a shaft;

FIG. 6 is similar to FIG. 5 showing another spreader tool for mounting the roller cage assembly of the present invention;

FIG. 7 is an enlarged side elevational view of the roller cage assembly mounted on a member such as a shaft;

Figure 8:
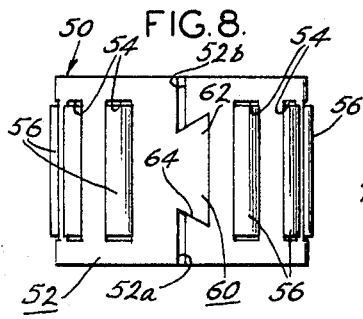
FIGS. 8 and 9 are side elevational views of a second embodiment of roller cage assembly in accordance with the present invention.

Referring now to the drawings and particularly to FIGS. 1 and 2 thereof, there is illustrated a section of a crank shaft incorporating a roller cage assembly in accordance with the present invention. The crank shaft, which is conventional, comprises the usual crank shaft 10, a series of crank pins 12 offset from the rotational axis of the crank shaft 10 and connected thereto by means of webs 14 and a connecting rod 16 rotatably supported on the crank pin 12 by means of a bearing assembly 18. As best illustrated in FIG. 2, the connecting rod has a yoke section 20 at one end adapted to partially circumscribe the pin 12 and cap 22 connected to the yoke section 20 by means of screw fasteners or the like 24.

The bearing assembly 18, as illustrated in FIGS. 3 and 4 in the present instance, is a needle roller bearing comprising a split annulus or ring-like retainer 32 having spaced apart confront terminal end portions 34a and 34b, a plurality of circumferentially spaced elongated slots 36 defining pockets for the rolling elements, in the present instance, needle rollers 38. The pockets 36 as illustrated in FIG. 4, have rounded or arcuate opposing side faces 37 conforming to the slope of the rollers to hold rollers 38 after they have been snapped into place in the pockets. The split annulus is preferably made of a resilient, deformable material such as a polyamide, or fluorocarbon resin or a type of these plastics which contains a fiber reinforcement.

The roller cage assembly described above is very easy to apply to a shaft member where the bearing assembly cannot be positioned over a shaft member from an axial end thereof such as the crank pin 12 of a crank shaft assembly 10 described above. For example, the retainer 32 may be immersed in an oil bath below the temperature of the rollers, i.e., 250° F. to partially plasticize the retainer material to facilitate spreading apart of the terminal ends of the retainer as shown in FIG. 5. It is noted that the application of heat as in an oil bath is of a sufficient degree to partially plasticize the retainer material without damaging the rolling elements. A suitable spreader tool 40 of the type illustrated in the drawings may be employed to spread the terminal ends 34a, 34b of the retainer 32 a sufficient distance apart to permit positioning of the retainer over the crank pin. Another form of spreader tool is illustrated in FIG. 6 and generally designated by the numeral 42. The type of tool used on the retainer is determined by the type of member on which the retainer is mounted. In the spread apart position, the retainer 32 is positioned over the crank pin 12. It is natural for the plastic materials described to return to their molded shapes when the opening forces are removed, the roller cage assembly assuming the position and shape shown in FIG. 7. The yoke end portion 20 of the connecting rod 16 is then positioned over the bearing assembly and the cap secured thereto by means of the screw fasteners 24 to complete the entire assembly. The roller cage assembly may also be assembled to a shaft member such as the crank pin 12 by localized heating of the retainer 32 at a point diametrically opposed to the terminal ends 34a and 34b. To this end the retainer 32 may be provided with an enlarged arcuate section 39 between the adjacent rollers diametrically opposed from the terminal ends, this enlarged section 39 permitting localized heating to facilitate spreading of the terminal ends. It is noted that the one-piece roller cage assembly of the present invention is much easier to handle and assemble than the prior two-piece assemblies discussed above. Further, since the retainer supports itself on the crank pin 12, it is much easier to assemble the cap member 22 to the yoke of the connecting rod 16. This contrasts with the prior two-piece assemblies where it is necessary to support the retainer sections and immediately assemble the elements of the connecting rod.

There is shown in FIGS. 8–19 inclusive further embodiments of roller cage assemblies in accordance with the present invention. These assemblies are similar in overall arrangement to the first embodiment described above and additionally include means for locking the terminal ends of the retainer after application to a shaft member such as a crank pin. Thus, the roller cage assembly shown in FIGS. 8 and 9, generally designated by the number 50, includes a ring-like split retainer 52 made of a moldable resilient material such as a polyamide or fluorcarbon resin or a type of these plastics which contains a fiber reinforcement, having a plurality of circumferentially spaced elongated pockets 54 for the needle rollers 56. This roller cage assembly is adapted to be positioned over a crank pin or the like by localized heating of the retainer as at 58 and spreading the terminal ends 52a, 52b apart and then bending the retainer to a circular shape. In the present instance, the roller cage assembly includes locking means generally designated 60 to secure the terminal ends 52a, 52b after assembly to a shaft member. The locking means 60 comprises a dovetail extension 62 projecting from one terminal end 52a of the retainer which seats in a dovetail slot 64 in the opposite terminal end 52b. In assembling this roller cage after heating the retainer and spreading the terminal ends 52a and 52b apart to permit positioning over a shaft member or the like, the terminal ends are bent inwardly toward one another and with the dovetail extension 62 overlying the slot 64 the dovetail is simply pressed down into the slot 64.

Figure 10:
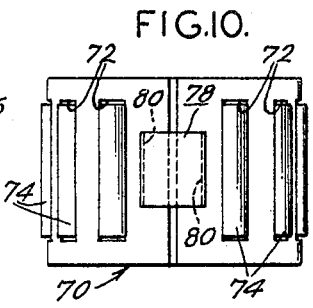
FIGS. 10 and 11 are plan and side elevational views respectively of a third embodiment of roller cage assembly in accordange with the present invention.
Figure 11:
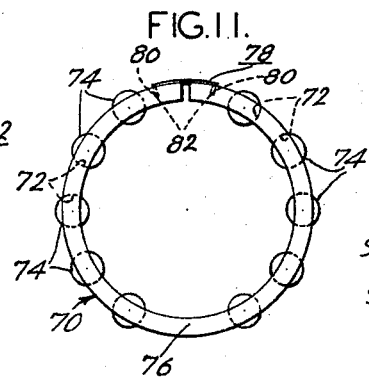

The roller cage assembly shown in FIGS. 10 and 11 comprises a split annulus or ring-type retainer 70 having pockets 72 for the rollers 74. In the present instance, the free terminal ends of the retainer are secured in the assembled relation by means of a clip 78 having spaced apart fingers 80 which engage in slotted grooves 82 in the outer face of the retainer adjacent the terminal ends thereof. This clip 78 is adapted to be inserted after the retainer has been assembled to the shaft member such as a crank pin in the assembly shown in FIGS. 1 and 2. This embodiment of roller cage may also be assembled to a shaft member by immersing in an oil bath or if desired, may be heated locally at a point diametrically opposed from the terminal ends together after assembly of the retainer facilitate the latter assembly method, the retainer may be provided with an enlarged arcuate section 76 diametrically opposed from its terminal ends.

Figure 12:
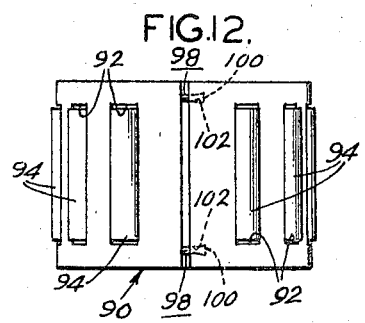
FIGS. 12 and 13 are plan and side elevational views respectively of a fourth embodiment of roller cage assembly in accordance with the present invention.
Figure 9:
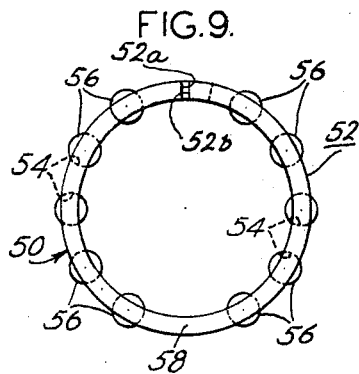
Figure 13:
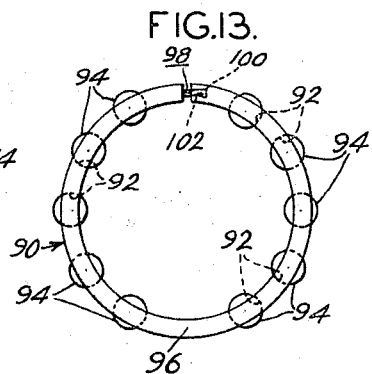

The roller cage assembly shown in FIGS. 12 and 13 comprises the split ring-like annulus 90 defining the retainer having circumferentially spaced pockets 92 for the rollers 94, the retainer being made of a resilient material. In the present instance, the means for securing the terminal ends together after assembly of the retainer to the shaft comprises a pair of spaced apart pins 98 projecting from one of the terminal ends, each pin 98 having an enlarged head 100 which engages in an opening 102 in the end face of the opposed terminal end of the retainer. The opening 102 is slightly smaller then the enlarged head 100 of the pin, the resilience of the material permitting the head of the pin to be snapped into the opening. This embodiment of roller cage may also be assembled to a shaft member by immerision in an oil bath or by localized heating, the retainer being provided with an enlarged arcuate section 96 diametrically opposed from the terminal ends to facilitate local heating of the retainer.

Figure 14:
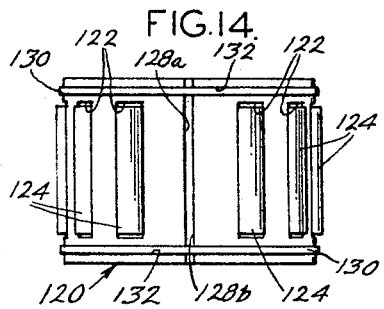
FIGS. 14 and 15 are plan and side elevational views respectively of a fifth embodiment of roller cage assembly in accordance with the present invention.
Figure 15:
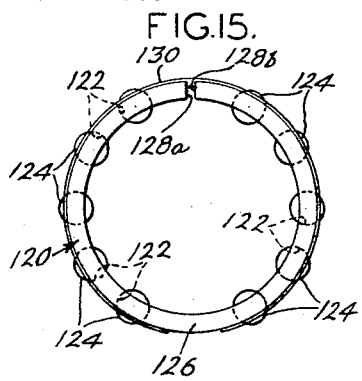

The roller cage assembly shown in FIGS. 14 and 15 comprises a split annulus or ring-type retainer 120 having pockets 122 for the rollers 124. In the present instance after assembly to a shaft member, the assembly is secured in its assembled relation by means of a pair of metal snap rings 130 which engage in circumferentially extending grooves 132 in the outer peripheral surface of the retainer adjacent opposite axial ends thereof. This embodiment of roller cage may also be provided with an enlarged arcuate section 126 between adjacent rollers diametrically opposed from the split terminal ends 128a and 128b to facilitate localized heating at this point, for assembly purposes, it being noted that the roller cage may be immersed in an oil bath to partially plasticize the material for assembly purposes if desired.

Figure 16:
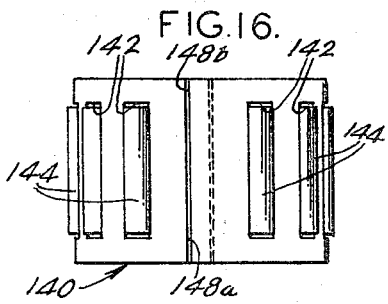
FIGS. 16 and 17 are plan and side elevational views respectively of a sixth embodiment of roller cage assembly in accordance with the present invention.
Figure 17:
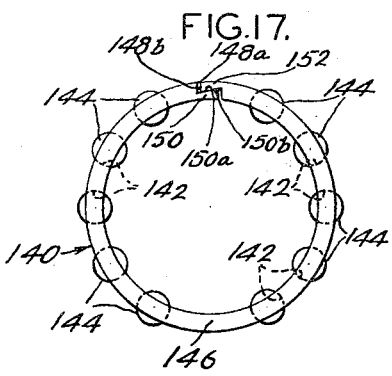

The roller cage assembly shown in FIGS. 16 and 17 also comprises a split ring-type retainer 140 having pockets 142 for the rollers 144. The locking means retaining the terminal ends together after assembly of the retainer to a shaft is provided by an undercut 150 in the outer face adjacent the terminal end 148a and an undercut 152 in the inner face of the retainer adjacent the terminal end 148b. The undercuts 150 and 152 have complementary tapered surfaces 150a and 152b respectively which interlock when in confronting relation in the manner shown in FIG. 17.

This embodiment of roller cage may also be provided with an enlarged arcuate section 146 adapted to be heated locally to permit spreading apart of the terminal ends 148a and 148b. It is noted that this roller cage also may be assembled by the alternate method, that is, immersion in an oil bath.

While particular embodiments of the present invention have been illustrated and described herein, it is not intended to limit the invention and changes and modifications may be made therein within the scope of the following claims.

We claim:

1. A roller cage assembly comprising a split annulus retainer made of a flexible resilient material, means defining a plurality of circumferentially spaced openings in said retainer defining pockets for rolling elements, the section of the retainer between adjacent pockets diametrically opposed from the terminal ends of the retainer being enlarged to permit heating and bending of the retainer at this section to facilitate spreading the terminal ends apart.

2. A roller cage assembly as claimed in claim 1 wherein the rolling elements consist of rollers adapted to be snapped into the pockets.

3. A roller cage assembly as claimed in claim 2 wherein the pockets are defined by confronting arcuate wall sections.

4. A roller cage assembly as claimed in claim 1 including locking means for detachably securing the terminal ends of the retainer.

5. A roller cage assembly as claimed in claim 4 wherein the locking means comprises a dovetail extension projecting from one terminal end of the retainer and a dovetail slot in the opposite terminal end within which the dovetail extension engages.

6. A roller cage assembly as claimed in claim 4 wherein the locking means comprises a clip having spaced apart fingers adapted to engage in slotted grooves in the outer face of the retainer adjacent the terminal ends thereof.

7. A roller cage assembly as claimed in claim 4 wherein said locking means comprises a pair of spaced apart pins projecting from one of the terminal ends of the retainer, each pin having an enlarged head engageable in an opening in an end face to the opposed terminal end of the retainer.

8. A roller cage assembly as claimed in claim 4 including means defining at least one circumferentially extending groove in the outer surface of the retainer and wherein the locking means comprises at least one snap ring engageable in said groove.

References Cited

FOREIGN PATENTS 959,699   3/1957   Germany.

MARTIN P. SCHWADRON, *Primary Examiner.*

FRANK SUSKO, *Assistant Examiner.*

UNITED STATES PATENT OFFICE
CERTIFICATE OF CORRECTION

Patent No. 3,399,008                                         August 27, 1968

Ronald J. Farrell et al.

It is certified that error appears in the above identified patent and that said Letters Patent are hereby corrected as shown below:

Column 2, line 36, "accordanue" should read -- accordance -- line 38, "accordange" should read -- accordance --. Column 3, line 2, "confront" should read -- confronting --. Column 4, lines 24 to 27, "together after assembly of the retainer facilitate the latter assembly method, the retainer may be provided with an enlarged arcuate section 76 diametrically opposed from its terminal ends" should read -- in the manner discussed above. To facilitate the latter assembly method, the retainer may be provided with an enlarged arcuate section 76 diametrically opposed from its terminal ends. --. Column 6, line 14, "to" should read -- of --.

Signed and sealed this 10th day of February 1970.

(SEAL)
Attest:

EDWARD M.FLETCHER,JR.                          WILLIAM E. SCHUYLER, JR.
Attesting Officer                                  Commissioner of Patents